(12) United States Patent
Heidenreich et al.

(10) Patent No.: US 9,108,134 B2
(45) Date of Patent: Aug. 18, 2015

(54) CATALYTIC FILTER SYSTEM

(75) Inventors: Steffen Heidenreich, Stimpfach (DE); Manfred Nacken, Schorndorf (DE)

(73) Assignee: PALL CORPORATION, Port Washington, NY (US)

( * ) Notice: Subject to any disclaimer, the term of this patent is extended or adjusted under 35 U.S.C. 154(b) by 264 days.

(21) Appl. No.: 13/563,798

(22) Filed: Aug. 1, 2012

(65) Prior Publication Data

US 2013/0034477 A1 Feb. 7, 2013

(30) Foreign Application Priority Data

Aug. 5, 2011 (EP) .................................... 11176731

(51) Int. Cl.
*B01D 50/00* (2006.01)
*B01D 46/00* (2006.01)
*B01D 53/86* (2006.01)
*B01D 46/24* (2006.01)

(52) U.S. Cl.
CPC ........ *B01D 46/0027* (2013.01); *B01D 46/2407* (2013.01); *B01D 53/869* (2013.01); *B01D 53/8631* (2013.01); *B01D 2255/20707* (2013.01); *B01D 2255/20723* (2013.01); *B01D 2255/20776* (2013.01); *B01D 2255/9205* (2013.01)

(58) Field of Classification Search
CPC ................. B01D 2255/20723; B01D 46/2407; B01D 2255/9205; B01D 2255/2707; B01D 2255/20776
USPC ..................................... 422/177, 180; 55/523
See application file for complete search history.

(56) References Cited

U.S. PATENT DOCUMENTS

| | | | |
|---|---|---|---|
| 5,087,277 A * | 2/1992 | Gonzalez et al. | ............... 55/523 |
| 5,536,285 A | 7/1996 | Isaksson et al. | |
| 6,290,743 B1 | 9/2001 | Alvin et al. | |
| 6,312,490 B1 | 11/2001 | Lippert et al. | |
| 6,863,868 B1 | 3/2005 | Alvin | |
| 2009/0019770 A1 | 1/2009 | Nacken et al. | |

FOREIGN PATENT DOCUMENTS

| | | |
|---|---|---|
| DE | 3705793 A * | 11/1987 |
| DE | 296 00 681 U1 | 5/1996 |
| DE | 196 27 028 A1 | 1/1998 |

(Continued)

OTHER PUBLICATIONS

European Search Report, Application No. 11176731.5 mailed Dec. 20 2011.

*Primary Examiner* — Tom P Duong
(74) *Attorney, Agent, or Firm* — Leydig, Voit & Mayer, Ltd (57) ABSTRACT

A catalytic filter system adaptable to the various challenges of a catalytic gas phase reaction is provided, wherein the system comprises a filtration vessel having a fluid inlet and a fluid outlet, a separation wall provided in the interior of the filtration vessel and a plurality of filter candles, the separation wall dividing the interior into a raw gas chamber and a clean gas chamber; the separation wall comprising a plurality of openings designed to sealingly accommodate the plurality of filter candles; the fluid inlet being arranged in fluid communication with the raw gas chamber upstream of the plurality of filter candles; the fluid outlet being arranged in fluid communication with the clean gas chamber downstream of the plurality of filter candles; and the filter system comprising a first catalytic medium accommodated in the clean gas chamber downstream of the filter candles and upstream of the fluid outlet.

12 Claims, 6 Drawing Sheets

(56) References Cited

FOREIGN PATENT DOCUMENTS

| EP | 0 600 440 | A2 | 6/1994 |
| EP | 2 017 003 | A1 | 1/2009 |
| WO | WO 92/18226 | | 10/1992 |
| WO | WO 98/03249 | A1 | 1/1998 |
| WO | WO 99/10633 | | 3/1999 |
| WO | WO 2006/037387 | A1 | 4/2006 |

\* cited by examiner

CATALYTIC FILTER SYSTEM

FIELD OF THE INVENTION

The invention relates to a catalytic filter system comprising a filtration vessel having a fluid inlet and a fluid outlet, a separation wall provided in the interior of said filtration vessel and a plurality of filter candles. The separation wall divides the said interior of the vessel into a raw gas chamber and a clean gas chamber and comprises a plurality of openings designed to sealingly accommodate said plurality of filter candles. The fluid inlet is in fluid communication with the raw gas chamber, and located upstream of the plurality of filter candles. The fluid outlet is in fluid communication with the clean gas chamber and located downstream of the plurality of filter candles.

BACKGROUND OF THE INVENTION

A filtration system of such type has been proposed in the U.S. Pat. No. 6,863,868 B1 and the filter candles used are catalytic filter candles such that the filtration system may be used for hot gas filtration.

Differently structured filter systems for cleaning flue gases are known from EP 0 600 440 A2 wherein a barrier filter module is used together with a separate catalyst module. The raw gas is first passed through the barrier filter module and then passed through the catalyst module.

Both types of catalytic filter systems are useful in flue gas treatment since they provide at the same time particle separation and a catalytic gas phase reaction in one unit.

However, the problem of such combined particle separation/catalytic gas phase reaction devices is that in cases where high catalytic conversion rates are required and have to be guaranteed for high inlet concentrations, the face velocity of the raw gas has to be reduced in order to increase the residence time of the gas for the catalytic reaction in the catalytic element. This leads to an increase of the number of filter elements in order to meet the required throughput and correspondingly to an increase of the size of the filter system.

In order to cope with the challenge of the particle load of the raw gas, i.e., the filtration action, such increase in size of the filter system typically would not be necessary.

BRIEF SUMMARY OF THE INVENTION

The object of the present invention is to provide a catalytic filter system where the face velocity may be determined by the filtration step and which is easily adaptable to the various challenges of the catalytic gas phase reaction stage.

This object is met by a catalytic filter system with the features of claim 1.

Catalytic filter systems of the present invention have a filtration vessel with a separation wall therein which at the same time separates the raw gas chamber from a clean gas chamber and provides for accommodation of the plurality of filter candles used.

Typically, the head space downstream of the filter candles which is necessary for handling the filter candles upon mounting and/or replacement may be used to accommodate a first catalytic medium which is separate from the filter candles.

Therefore, the face velocity of the flue gas to be treated may be governed by the filtering capacity of the filter candles, the number of which and the size of which may be adapted to the specific filtration task. The catalytic stage, i.e., the capacity of the first catalytic medium downstream of the filter candles may be easily adapted to the challenge posed by the contaminants of the flue gas which are to be removed or converted in a catalytic gas phase reaction.

DETAILED DESCRIPTION OF THE INVENTION

In a preferred catalytic system according to the present invention, the filter candles comprise a catalyst and serve as catalytic filter candles.

Thereby, the catalytic gas phase reaction may already occur in the filter candles and the first catalytic medium downstream of the filter candles serves for the conversion of the remaining contaminants of the clean gas up to the required level.

The filter candles used in the inventive catalytic filter system preferably comprise an outer filter membrane upstream of the filter element.

The filter membrane may preferably be selected of the fine-filtering type. Fine-filtering type membranes are able to retain particles of a size down to less than about 1 µm, e.g., about 0.5 µm.

The present invention provides an arrangement of the catalytic medium and the filter candles in the same housing and nevertheless offers the flexibility to adapt the filter system to numerous filtration application, e.g., in flue gas filtration, and allows that both the filtration stage and the catalytic stage may be kept at the same temperature with no need for a heating device to improve the efficiency of the catalytic filter system.

Higher temperatures typically accelerate the reaction rate of the catalytic gas phase reaction and are often wanted. According to the present invention, gaseous fluids which enter the catalytic filter system at an elevated temperature essentially retain such temperature when they come into contact with the first catalytic medium. Therefore, in many applications no heating system is required in order to ensure satisfactory reaction rates.

In some embodiments of the inventive catalytic filter system, the filter system may further comprise a second catalytic medium downstream of the first catalytic medium or even additional catalytic media downstream of the second catalytic medium.

Preferably, the first and/or second catalytic media comprise a filter element having an average pore size which is about equal or larger than the average pore size of the filter candles.

According to another advantageous embodiment of the catalytic filter system of the present invention, a blow back device is provided in fluid communication with the clean gas chamber.

Preferably, the separation wall is oriented horizontally within the filtration vessel so that the filter candles accommodated in the openings of the separation wall are pending from the same wall into the raw gas chamber. Such an arrangement enables the variation of the filtration capacity by inserting different numbers of filter candles and/or filter candles of different length and thereby allows the adjustment of the filter surface area and the filtration capacity of the system to the specific requirements of varying applications.

In a further embodiment of the present invention, the catalytic filter system comprises a first or second catalytic medium which is provided in the form of a safety fuse. Safety fuse catalytic elements typically have a depth filter structure and serve as a safety measure in case a filter candle breaks. The safety fuse catalytic element(s) then prohibit(s) the passage of non-filtered raw gas into the clean gas chamber. Preferably, one safety fuse catalytic element is provided for each of the filter candles.

The blow back device fluidly connected to the clean gas chamber is preferably connected to the clean gas chamber upstream of the first catalytic medium.

If the first catalytic medium should happen to include or be in the form of a filter element, it is preferred to have the blow back device arranged such that it is fluidly connected to the clean gas chamber downstream of the first catalytic medium.

By operating the blow back device of such preferred catalytic filter system according to the present invention, it is possible to regenerate at the same time not only the filter element of the first catalytic medium, but also the filter candles.

Upon feeding blow back gas via the blow back device into the filter system, the raw gas inlet upstream of the filter candles may be operated as a blow back gas outlet.

The filter system of the present invention typically will include a vessel comprising a vessel part which is detachable from the main body of the vessel at a location downstream of the separation wall. More preferably, the detachable vessel part is designed to accommodate the first and/or second catalytic medium.

If the filter system comprises a blow back device, it is preferably accommodated in the main body of the vessel together with the separation wall and the filter candles.

The filter candles may have a porous body with a filtering membrane on the upstream side. The porous body of the filter candles may in addition be impregnated with a catalyst. The filter candles then serve as catalytic filter candles.

Non-catalytic filter candles as well as catalytic filter candles are preferably of a hollow cylindrical shape. In some cases, the interior space of such filter candles in addition may partially or completely be filled with a catalyst material, especially in the form of a foam, fibers or granular particles, wherein the latter may be provided as a fixed bed.

The type of catalytic elements used for the first, second and any further catalytic medium may be selected from catalytic fixed bed, fiber mats, foamed structures, tubular elements, plates and/or honeycomb structures.

The catalytic elements may comprise porous bodies impregnated with a catalyst having an interior that forms a space for fluid flow. The space provided in the interior of the element may additionally accommodate further catalyst material. Thus, a catalytically impregnated porous body may have an interior space partially or completely filled with a catalytically impregnated material of a foam, granular particles or fibers. Typical examples are tubular elements or cassette type elements.

Generally speaking, the catalytic elements forming part of a catalytic medium may be of quite diverse structures, e.g., tubular, of a cassette type, plate shaped, block shaped or in the form of a fiber mat.

Typical examples for catalytic elements used for the first, second and any further catalytic medium are as follows:

Catalytically impregnated safety fuses with a porous body made of sintered ceramic granular particles and/or fibers or a foam and preferably having an average pore size of about 10 to about 500 µm, more preferably about 50 to about 200 µm. Preferably, one safety fuse is provided per filter candle.

Catalytically impregnated porous bodies made of a ceramic foam of about 10 to about 60 ppi (pores per inch), more preferably about 30 to about 45 ppi of sintered granular particles with an average particle size from about 0.1 to about 100 µm, more preferably about 0.3 to about 30 µm.

Catalytically impregnated porous bodies made of ceramic fibers with an average fiber diameter of about 1 to about 50 µm, more preferably about 2 to about 10 µm. The preferable average fiber length is in the range of about 1 to about 20 mm.

Fixed bed of catalyst particles having an average particle size of from about 10 µm to about 30 mm, more preferably about 100 µm to about 10 mm.

The applications of the catalytic filter system of the present invention cover hot gas filtration applications of various types where the removal of particulates can be combined with catalytic gas phase reactions. It may further be used for hot gas cleaning in coal and biomass gasification, in exhaust gas cleaning of sinter plants and coak oven plants, in exhaust gas cleaning of power plants and incinerators, refinery processes like in FCC (fluid catalytic cracking) units or in chemical processes, in the cement industry etc.

Catalytic ceramic filter candles which are especially useful for providing the plurality of filter candles accommodated in the separation wall are disclosed in WO 2006/037387 A1 and EP 2 017 003 A1.

The advantages of the present invention will be discussed in more detail in connection with specific embodiments according to the attached drawings and the examples.

DETAILED DESCRIPTION OF THE DRAWINGS

Figure 1:
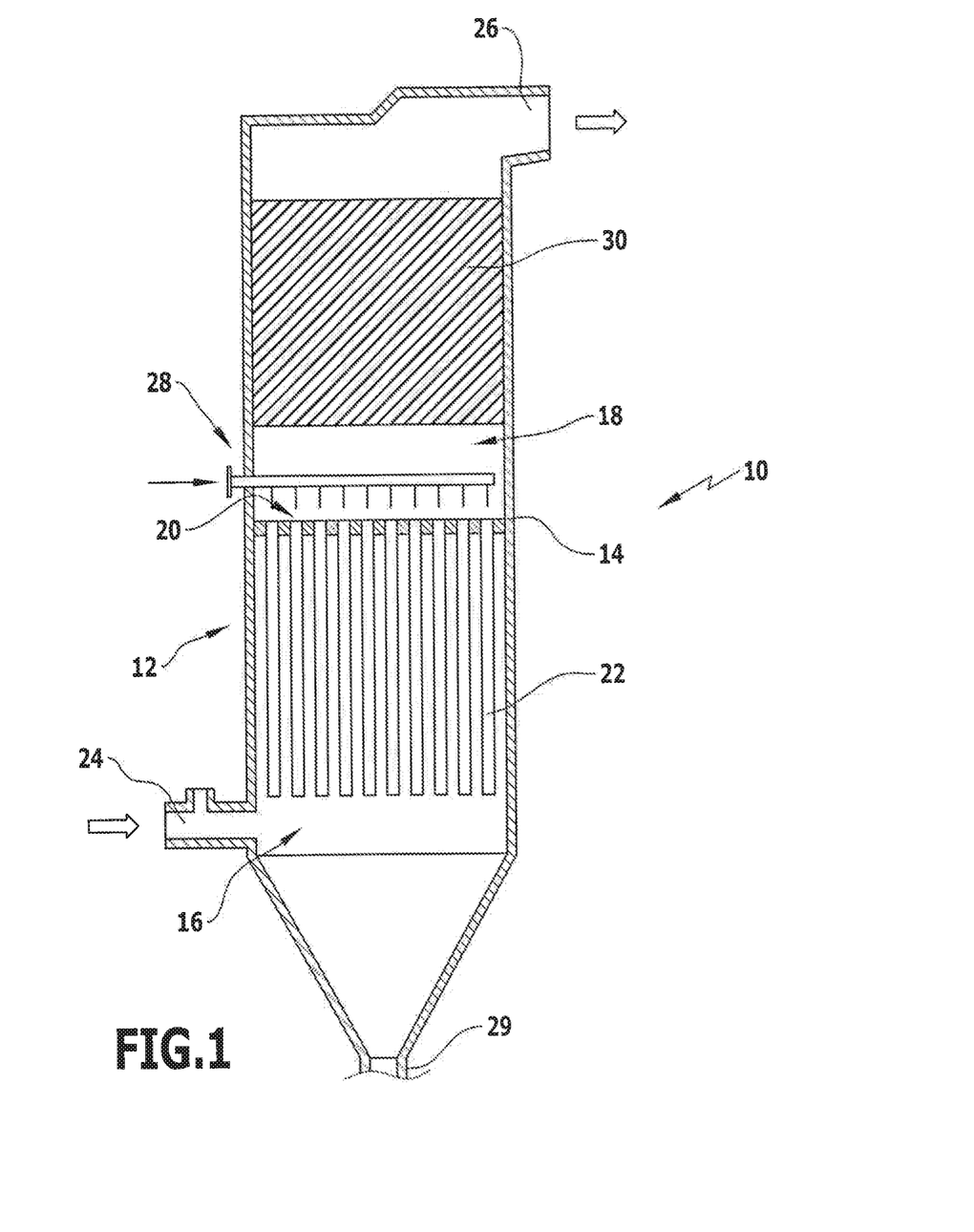
FIG. 1 shows a schematic representation of a first catalytic filter system according to the present invention.

FIG. 1 shows a schematic representation of a catalytic filter system 10 of the present invention which comprises a cylindrical vessel 12 the interior of which is separated by a separator wall 14 into a raw gas chamber 16 and a clean gas chamber 18.

Typically, the dimensions of the cylindrical vessel include a diameter in the range of about 1 m to about 6 m or more and a height of about 4 m to about 24 m or more.

In order to access the interior of vessel 12 for maintenance or repair, the vessel may be separable into a lower stationary and an upper removable part. Very large vessels, however, typically will be provided with a closable opening (not shown) in the vessel wall enclosing the clean gas chamber such that personnel may enter the vessel.

The separation wall 14 has a plurality of openings 20 which receive a plurality of filter candles 22. The filter candles 22 are accommodated in the separation wall 14 with one of their ends such that their bodies are substantially vertically pending from the separation wall into the raw gas chamber 16.

A raw gas inlet 24 is connected to the vessel 12 such that it directly communicates with the raw gas chamber 16. The clean gas chamber 18 is in fluid communication with a clean gas outlet 26.

Downstream of the plurality of filter candles 22, i.e., above the filter candles in the clean gas chamber 18 a blow back device 28 is accommodated which is used to create a reverse fluid flow in order to intermittently regenerate the filter candles 22. At the bottom of the vessel 12, a closable outlet 29 is provided in order to allow intermittent removal of particulate matter from vessel 12.

Further downstream, i.e., above the blow back device 28, a first catalytic medium 30 is provided in the clean gas chamber 18 which serves to remove gaseous contaminants in the clean gas fluid.

The filter candles 22 may be selected from conventional non-catalytic or catalytic filter candles.

The face velocity can be increased to the maximum possible velocity determined by the filtration capacity of the filter candles 22. According to the contaminant load of the clean gas in a specific application the capacity of the catalytic medium 30 is adjusted and/or catalytic filter candles are used instead of non-catalytic filter candles. Thereby the desired conversion rate can be guaranteed under all operating conditions.

The catalytic medium 30 in FIG. 1 may be selected from a broad range of catalytic media which may comprise safety fuses, porous bodies of ceramic foam, porous bodies of sintered granular and/or fibrous particles, fixed bed catalysts etc.

Figure 2:
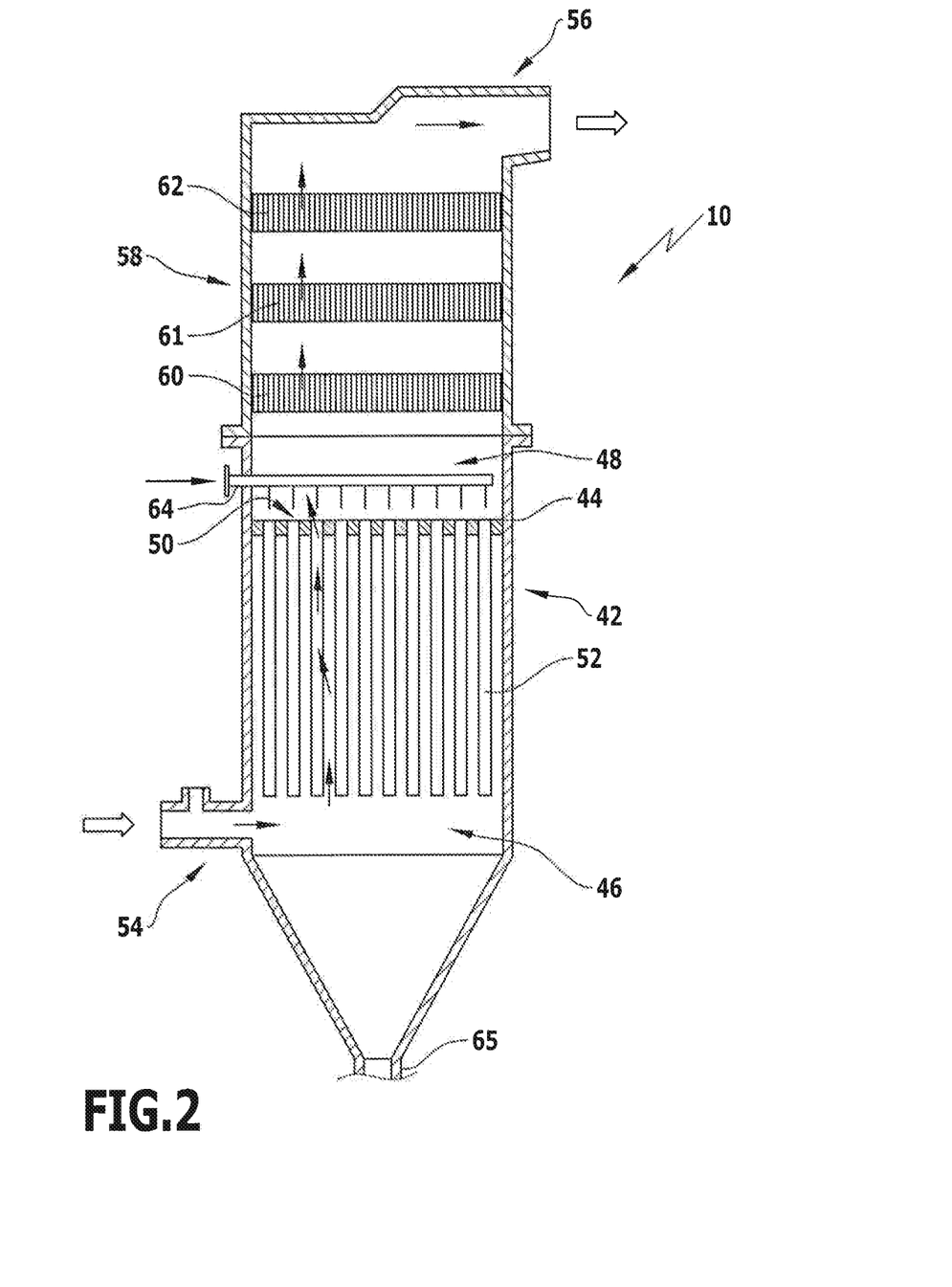
FIG. 2 shows a schematic representation of a second catalytic filter system according to the present invention.

FIG. 2 shows another catalytic filter system 40 according to the present invention comprising a cylindrical vessel 42 the interior of which is separated by a separator wall 44 into a raw gas chamber 46 and a clean gas chamber 48.

The separator wall 44 has a plurality of openings 50 which are adapted to sealingly accommodate filter candles 52 which depend from the horizontally arranged separator wall 44 into the raw gas chamber 46. A raw gas inlet 54 is provided at the lower portion of the vessel 42 and is arranged in fluid communication with the raw gas chamber 46.

In the upper portion, the vessel 42 comprises a clean gas outlet 56 which is in fluid communication with the clean gas chamber 48.

On the downstream side of the separation wall 44, i.e., the upper portion of the vessel 42, is designed separable from the main body of the vessel 42 and in the following referred to as the detachable vessel part 58. The detachable vessel part 58 typically will accommodate the afore-mentioned clean gas outlet 56 and provide space to accommodate the first catalytic medium (and any further, if applicable) which according to the present invention is to be arranged downstream of the filter candles.

In the embodiment of the present invention schematically shown in FIG. 2, the first catalytic medium comprises three honeycomb catalytic elements 60, 61 and 62 which are exchangeably fixed in the upper detachable part 58 of the vessel 42.

Although FIG. 2 shows the catalytic elements 60, 61, 62 spaced apart from one another, they may be in alternative embodiments likewise arranged in direct contact with one another.

Each of the honeycomb catalytic elements may be composed of a plurality of individual subunits which are assembled, e.g., in a common frame structure.

Clean gas exiting the filter candles 52 and entering the clean gas chamber 48 will have to pass through the honeycomb elements 60, 61 and 62 of the first catalytic medium prior to exiting the vessel 42 via the clean gas outlet 56.

The number of honeycomb elements may be adjusted to the pollution of the raw gas such that the desired conversion of NOx is achieved in one pass of the fluid gas through vessel 42.

Figure 3A:
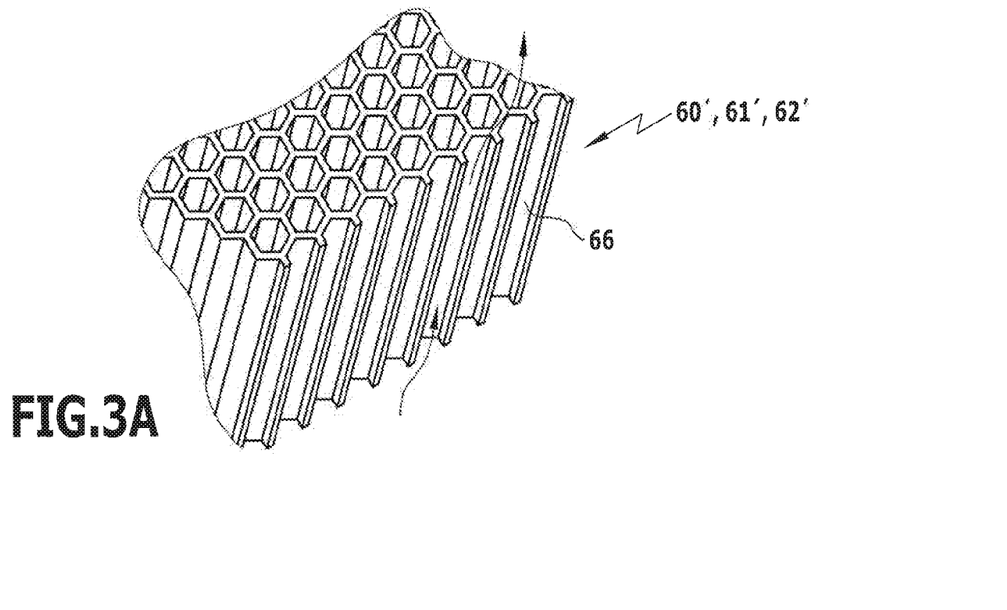
FIGS. 3A and B show a detail of the catalytic media used in the second catalytic filter system of FIG. 2.
Figure 3B:
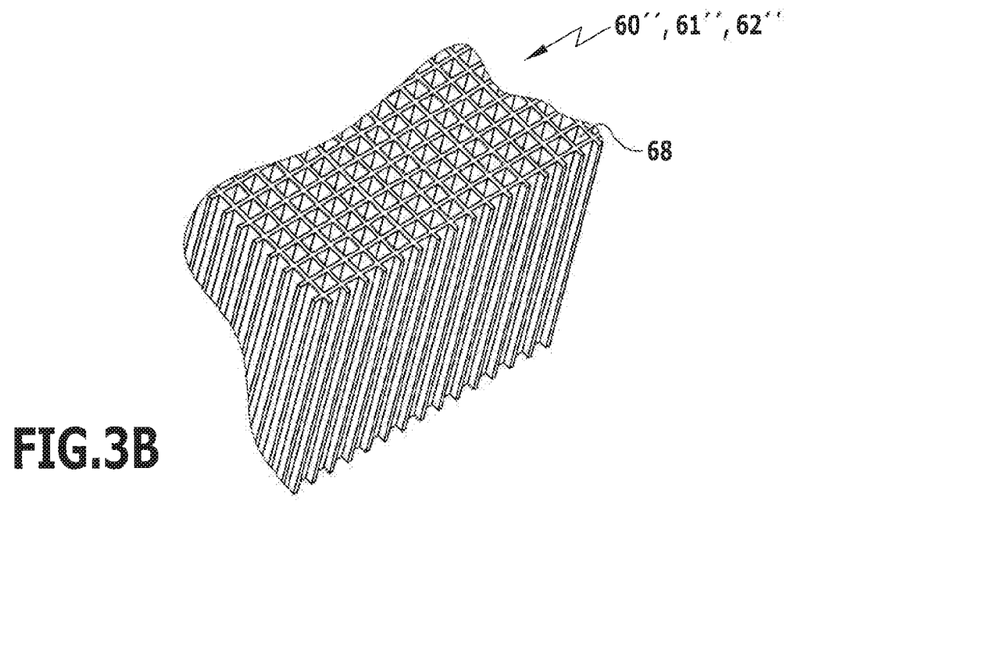

Typical examples of honeycomb structures which may be used as catalytic elements 60, 61 and 62 are shown in FIGS. 3A and 3B. From a comparison of FIGS. 3A and 3B it is apparent that the honeycomb structure need not necessarily have channels of hexagonal structure, but may also be of a different cross-sectional shape, e.g., square cross-section channels as shown in FIG. 3B.

The clean gas entering the clean gas chamber 48 passes through the numerous channels 66, 68 in the honeycomb elements 60', 61', 62' and 60", 61", 62" in intimate contact with the catalyst supported by these honeycomb structures.

As described in connection with the embodiment shown in FIG. 1 already, it is advantageous to have a blow back device 64 provided on the downstream side of the filter candles 42 and still upstream of the honeycomb elements 60, 61 and 62 in order to provide a possibility to intermittently regenerate the filter candles by a reverse flow of gas. More preferably, the blow back device 64 is located in the main body of vessel 42 and not in the detachable part 58. At its bottom, vessel 42 comprises a closable outlet 65 which serves for intermittent removal of particulate matter released from the filter candles during an operation of the blow back device 64.

Figure 4:
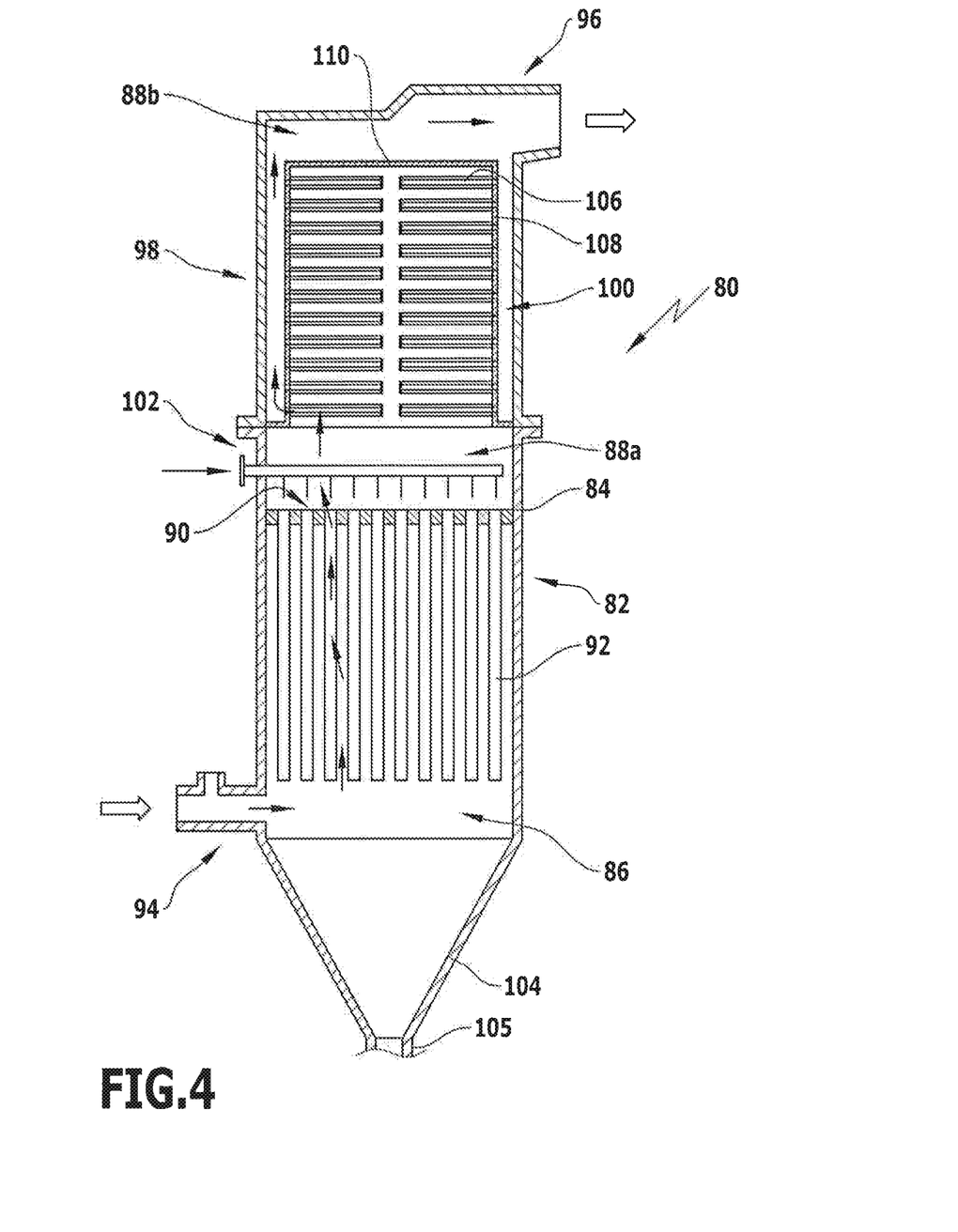
FIG. 4 shows a schematic representation of a third catalytic filter system according to the present invention.

FIG. 4 shows another embodiment of the present invention in the form of a catalytic filter system 80 comprising a vessel 82 which is separated by a horizontally oriented separation wall 84 into a raw gas chamber 86 and a clean gas chamber 88. The vessel 82 may be of a cylindrical shape or of a rectangular shape.

The separation wall 84 has a plurality of openings 90 accommodating filter candles 92 in a sealing manner such that the filter candles depend from the separation plate 84 and extend into the raw gas chamber 86. A raw gas inlet 94 is provided at the lower portion of vessel 82 and is in direct communication with the raw gas chamber 86.

At its upper portion, vessel 82 comprises a clean gas outlet 96 which is in communication with the clean gas chamber 88.

As described already in connection with FIG. 2, the vessel 82 is divided in two portions which are detachable from one another, the upper, detachable part 98 accommodating the first catalytic element and the clean gas outlet 96 downstream of the position in which the first catalytic element 100 is accommodated. In between the first catalytic element 100 and the separation wall 84, a blow back gas device 102 is provided which allows blowing back of a gas through the filter candles 92 into the raw gas chamber 86 in order to intermittently regenerate the same.

The particles removed from the filter candles 92 by blowing back are collected in the lowermost portion 104 of the vessel 82 and are removed intermittently through a closable outlet 105.

The raw gas inlet 94 may be operated as an outlet for the blow back gas.

Figure 5:
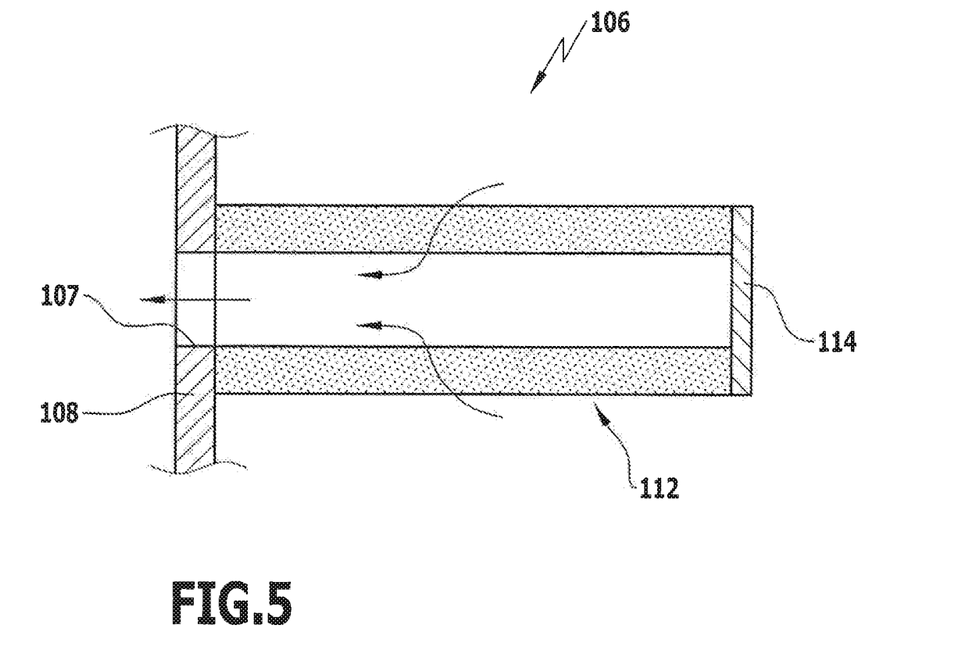
FIG. 5 shows a porous catalytic body used in the third filter system of FIG. 4 in more detail.

The first catalytic medium 100 is composed of a plurality of catalytic elements 106 which are preferably hollow cylindrical bodies made of fibers, granular particles and/or foam the structure of which is shown in more detail in FIG. 5. In case the catalytic element 106 is to serve as a safety fuse, a structure based on fibers and/or granular particles is preferred. The catalytic elements 106 are preferably accommodated in a cylindrical wall 108 comprising a plurality of openings 107 which accommodate the individual catalytic elements 106 in a sealing manner. The cylindrical wall 108 is closed at its top portion 110 and open at its lower end which is in direct fluid communication with the clean gas chamber 88.

The lower end of the cylindrical wall 108 is in addition sealingly connected to the wall of the upper detachable vessel part 98 such that clean gas exiting from the filter elements 92 and entering the clean gas chamber 88 will have to pass through the individual catalytic elements 106 accommodated in the cylindrical wall 108 prior to exiting the system 80 via the clean gas outlet 96. The cylindrical wall 108 thereby separates the clean gas chamber 88 into compartments, one being upstream of the catalytic medium 100 and its catalytic elements 106 and the other one being downstream of the catalytic element 100. The outer diameter of the cylindrical wall 108 is somewhat smaller than the inner diameter of the upper detachable part 98 of the vessel 82 in order not to obstruct the fluid flow from the catalytic elements 106 into the surrounding volume of the wall 108 which is in fluid connection with the clean gas outlet 96.

The vessel 82 may be of a rectangular cross-section. The wall 108 accommodating the catalytic elements 106 of the first catalytic medium 100 will then typically also be designed to enclose a rectangular space.

The catalytic elements 106 may be of a cassette type structure with a lower and an upper flat porous wall. While the side faces may be impervious to clean gas in one embodiment, in other embodiments the side walls may be made of the same material as the lower and upper walls. One side wall will comprise an opening matching an opening 107 in the wall 108.

FIG. 5 shows in detail one of the catalytic elements 106 accommodated in the wall 108. The catalytic element 106 has a cylindrical body 112 which is closed at one end thereof by a sealing bottom plate 114. The sealing bottom plate 114 of the cylindrical catalytic element 106 could be fluid-impervious or could be made of the same material as the cylindrical wall 112 and thereby in addition contribute to the catalytic conversion of contaminants still contained in the clean gas entering the catalytic element 106.

The opposite end of the cylindrical body 112 is open and connected to the wall 108 such that the corresponding opening 107 in the wall 108 allows the clean gas exiting the catalytic element 106 and leaving the system via the clean gas outlet 96.

Figure 6:
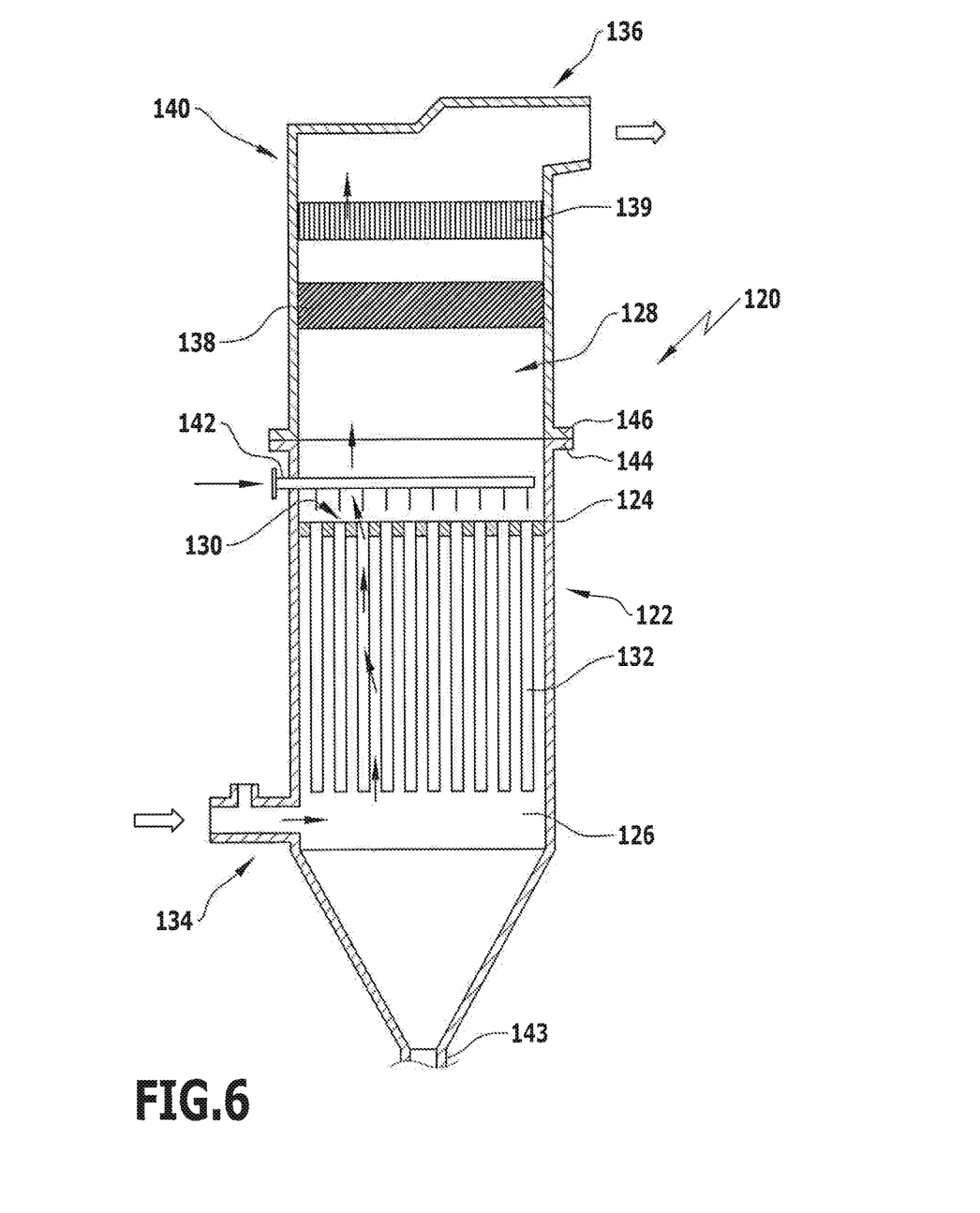
FIG. 6 shows a schematic representation of a fourth catalytic filter system.

A further embodiment of the present invention is shown in FIG. 6 where a catalytic filter system 120 comprises a vessel 122 which is of substantially cylindrical shape.

The vessel 122 is separated by a separator wall 124 into a raw gas chamber 126 and a clean gas chamber 128.

The separation wall 124 comprises a plurality of openings 130 which are designed to sealingly accommodate cylindrical filter candles 132 which are inserted into the openings 130 and depend from the separation wall 124 into the raw gas chamber 126.

The vessel 122 further comprises a raw gas inlet 134 which is in direct fluid communication with the raw gas chamber 126.

On its upper portion, the vessel 122 comprises a clean gas outlet 136 which is in fluid communication with the clean gas chamber 128.

The clean gas chamber accommodates a first catalytic medium 138 and optionally a second catalytic medium 139.

Again, the vessel 122 is advantageously separated into a detachable part and a main part, the upper, detachable part 140 accommodating the clean gas outlet 136 and the first catalytic medium 138 and the optional second catalytic medium 139.

The first catalytic medium 138 may be in the form of a fixed bed. Alternatively, it can be composed of block-shaped ceramic foam elements or of fiber mats.

The second catalytic medium 139 may have, e.g., a honeycomb structure impregnated with a catalyst. The catalyst may be different from the catalyst of the first catalytic medium 138 in order to support removal of a further contaminant from the clean gas.

After passing through the catalytic media 138 and 139, the clean gas exits the system 120 through the clean gas outlet 136.

Furthermore, the vessel 122 includes in its main part a blow back device 142 which serves the same purpose as the blow back devices of the previously discussed embodiments of FIGS. 1, 2 and 4. Particulate matter may be removed intermittently from the bottom of vessel 122 through a closable outlet 143.

The upper detachable part 140 of the vessel 122 is attached to the main part of the vessel 122 via radially outwardly extending flanges 144, 146 which allow to sealingly mount the detachable part 140 on the main part of vessel 122.

In all embodiments of the afore-discussed Figures, the flue gas passes with an essentially unchanged temperature through the filter elements from the raw gas chamber into the clean gas chamber and then passes through the first catalytic medium.

Because of this, the temperature of the catalytic medium is heated up to about the same temperature as the temperature of the flue gas when entering the vessel without the need of having a heating device provided.

Thereby a high catalytic activity of the catalytic medium can be provided.

In order to additionally increase the catalytic conversion, the filter candles accommodated in the separator walls of any one of the embodiments discussed above may be provided as catalytic filter candles, i.e., the filter candles already comprise a deposited catalyst in their filter element structure.

Likewise, the first catalytic medium may be supplemented by a second or even further catalytic medium, as need may be.

Since it is advantageous in various respects to position the vessel of the catalytic filter system with a vertical orientation of its main axis, all of the embodiments described make use of such orientation. It is to be noted, however, that the inventive filter system may of course likewise be operated with a horizontal orientation of the main axis of the vessel.

REFERENCE EXAMPLE

In this Reference Example, a catalytic filter system was used as shown in FIG. 1 where the filter candles were conventional DeNOxCatFil catalytic filter elements generally available on the market from Pall Filtersystems GmbH. The catalytic medium 30, however, was omitted. The dimensions of these filter elements were: an outer diameter of 60 mm and a length of about 1515 mm. The composition of the filter candles well as their manufacturing process has been described in Example 1 of WO 2006/037387 A1 which is incorporated herewith by reference in its entirety.

These filter elements are used in a typical DeNOx application where the NO inlet concentration amounts to about 300 ppmV and a NO conversion of about 90% is required.

The face velocity at the catalytic filter elements has to be limited to 60 m/h in order to achieve the required NO conversion. Roughly 1,500 of the above-specified catalytic filter elements will have to be used under typical operating conditions of 300° C. for a guaranteed conversion of the NO contents of about 90% during a three years' period.

If the diameter of the vessel of the catalytic filter system has to be reduced, e.g., for cost reasons, the number of catalytic filter elements may be reduced to 1,000. If the volume flow rate is kept constant, a face velocity of 90 m/h results. At a temperature of 300° C., an NO conversion of only about 80% may be guaranteed for a three years' period in such case.

EXAMPLE 1

The catalytic filter system according to Example 1 of the present invention uses the same DeNOxCatFil catalytic filter elements as in the Reference Example. The number of catalytic filter elements was 1,000 to reduce the vessel costs and the face velocity was set to 90 m/h.

In order to increase the NO conversion rate from about 80% to about 90% which can be guaranteed over three years, a number of 1,000 tubular catalytic elements 106 of the dimensions (outer/inner diameter×length) 60/44×1000 mm is used in addition as a first catalytic medium 100 downstream of the DeNOxCatFil filter candles 92 which may be installed as schematically shown in the embodiment of FIGS. 4 and 5.

For the preparation of a body of such a catalytic porous element 106 a hollow cylindrical element of the dimensions 60/44×1000 mm made of SiC granular particles with an average diameter of from about 550 μm to about 750 μm and $SiO_2$—$Al_2O_3$ based fibres with a thickness of about 2 to about 3 μm and a length in the range of about 1 to about 5 mm are used with a mass ratio of granular particles to fibers of about 40:1 to about 50:1.

For sintering this mixture of granular particles and fibers under atmospheric conditions 16.4% by weight of a sintering aid, based on the mass of the mixture were added to the same. An exemplary sintering aid is clay.

Catalytic activation of the sintered element body with an average pore size of 150±20 μm and a pore volume of 42±5 volume % is performed by means of the incipient wetness technique by using an SCR (selective catalytic reduction) catalyst of the composition $TiO_2$—$V_2O_5$—$WO_3$ (cf. Example 1 of WO 2006/037387 A1). The weight % of deposited $TiO_2$ in a first step in relation to the sintered mass of the element body by use of a suspension of $TiO_2$ powder with a BET surface of about 50 $m^2$ is about 1.5.

The appropriate amounts of $V_2O_5$ and $WO_3$ deposited in a common subsequent step are about 0.3% by weight and about 2% by weight, respectively.

The volumetric flow rate corresponding to a face velocity of 90 m/h of the raw gas results in a face velocity of 130 m/h of the clean gas when passing through the catalytic elements of the first catalytic medium because of their smaller surface area as compared to the surface area of the filter candles 92.

The NO conversion rate provided by these catalytic elements when used as a first catalytic medium 100 at 300° C. and a face velocity of 130 m/h amounts to about 60%, if an $NH_3$/NO ratio of 1 and an $O_2$ content of 3 volume % is adjusted.

The combined conversion rates of the catalytic filter elements 92 and the catalytic elements 106 amount to about 90% and can be guaranteed over a time period of three years.

EXAMPLE 2

Example 2 is based on the use of a catalytic filter system as described in the Reference Example, where the number of catalytic filter elements has been limited to 1,000 and the face velocity is set to 90 m/h.

In order to increase the NO conversion rate to 90%, which can be guaranteed over three years, a number of 4,300 tubular catalytic ceramic foam elements of the 30 ppi (pore per inch) type and the dimension 40/10×500 mm as a first catalytic medium 100 downstream of the DeNOxCatFil elements may be installed as shown in FIGS. 4 and 5. Thereby a face velocity of the clean gas when entering the first catalytic medium 100 of 90 m/h is obtained.

For the preparation of the appropriate catalytic ceramic foam elements of the dimension 40/10×500 mm an $Al_2O_3$ based tubular ceramic foam body of 30 ppi is catalytically activated with an SCR catalyst of the composition $TiO_2$—$V_2O_5$—$WO_3$ by using a wet impregnated technique followed by complete infrared drying. The wet impregnation technique is similar to the two-step impregnation process described in Example 1 of WO 2006/037387 A1, while the paraffin wax coating step was omitted. The amount of deposited $TiO_2$ on the $Al_2O_3$ based ceramic foam body by use of a suspension of $TiO_2$ powder with a BET surface of 50 $m^2$ is 0.7% by weight in relation to the mass of the ceramic foam body. After complete infrared drying in deviation to the procedure of the afore-referenced Example 1, a thermal treatment step at 300° C. for 5 h was performed. The loading amounts of $V_2O_5$ and $WO_3$ are 0.7 and 1.2% by weight, respectively.

The NO conversion of such a tubular catalytic ceramic foam element used as first catalytic medium 100 at 300° C. and a face velocity of 90 m/h amounts to 60%, if an $NH_3$/NO ratio of 1 and an $O_2$ content of 3 volume % is provided.

The combined conversion rates of the catalytic filter elements and the first catalytic medium amounts to about 90% and can be guaranteed for a time period of three years.

The size of the vessel of the filter system and correspondingly the costs of the system may be reduced, because of the number of filter candles limited to 1,000 and the additional 4,300 catalytic elements. The higher the number of filter candles to be used, the larger the diameter of the vessel needs to be which tremendously increases the costs for providing the filter vessel.

On the other hand, when the height of the filter vessel needs to be increased in order to increase the volume of the clean gas chamber to accomodate a further catalytic medium, the increase in costs is relatively low.

EXAMPLE 3

Example 3 demonstrates the use of the catalytic filter system of the present invention in a tar reforming process. In the catalytic filter system of FIG. 4, catalytic filter candles 92 for the combined particle separation and catalytic tar reforming were used instead of the DeNOxCatFil candles.

A volume flow of 3,100 $Nm^3$/h model biomass gasification gas containing 5 g/$Nm^3$ naphthalene as tar model compound was fed in the system at 850° C. under atmospheric pressure.

The model biomass gasification gas contains 50 vol % $N_2$, 12 vol % CO, 10 vol % $H_2$, 11 vol % $CO_2$, 5 vol % $CH_4$ and 12 vol % $H_2O$ in this case.

A conversion of 60% is achieved with a number of 660 $Al_2O_3$ based grain-sintered tar reforming catalytic filter elements of the dimensions 60/40×1,500 mm at a face velocity of 72 m/h in the presence of 100 ppmV $H_2S$.

The catalytic filter elements were prepared according to the teaching of Example 1 of US 2009/0019770 A1 with the following adaptations:

SiC grains are substituted by alumina particles of equal size.

The mullite membrane is substituted by a comparable membrane of alumina.

In the first impregnation step, the MgO—$Al_2O_3$ loading is reduced from 0.9% by weight to 0.8% by weight.

In the second impregnation step, an appropriate Ni nitrate hexahydrate solution was used to produce a Ni oxide loading of 60% by weight in relation to the loading mass of MgO—$Al_2O_3$.

US 2009/0019770 A1 is incorporated herein by reference in its entirety.

In order to increase the naphthalene conversion from 60% up to about 90% at 850° C. under the above conditions, according to the present invention a catalytic medium in the form of tubular catalytic ceramic foam elements of 45 ppi as first catalytic medium 100 and of the dimension 40/20×500 mm may be used downstream of the tar reforming catalytic filter candles 92 as shown in FIGS. 4 and 5.

The body of such catalytic ceramic foam elements is prepared by catalytic activation of an $Al_2O_3$ based ceramic foam body of the 45 ppi type using a wet impregnation technique followed by complete infrared drying similar to the process described in Example 1 of US 2009/0019770 A1, while the two paraffin wax coating steps were omitted. A $MgO$—$Al_2O_3$ and NiO loading of 6.2 wt % and 3.7 wt %, respectively, in relation to the mass of the ceramic foam are deposited in two subsequent steps.

The use of a number of 1,200 catalytic ceramic foam elements results in a face velocity of 170 m/h. At 850° C., a naphthalene conversion of 70% for this catalytic medium downstream of the grain-sintered catalytic filter candles is obtained.

In total, a naphthalene conversion of 88% is achieved under these conditions and would allow a higher syngas and hydrogen yield in biomass gasification.

The present invention obtains for the first time conversion rates as high as about 90% under the above-described conditions.

Further improvements may be obtained by partially or completely filling the interior space of the catalytic filter candles with additional catalyst material. Thereby, an even higher conversion rate is possible.

Additionally or alternatively, the number of catalytic filter elements may be reduced, thus allowing a reduced diameter of the vessel of the catalytic filter system. Because of the high operating temperature, the savings obtained by reducing the diameter of the vessel are very high.

As a further alternative, the number of tubular catalytic ceramic foam elements may be reduced.

The invention claimed is:

1. A catalytic filter system comprising a filtration vessel having a fluid inlet and a fluid outlet, a separation wall provided in the interior of said filtration vessel and a plurality of filter candles;
   wherein said separation wall is oriented horizontally within the filtration vessel and divides said interior into a raw gas chamber and a clean gas chamber;
   wherein said separation wall comprises a plurality of openings designed to sealingly accommodate said plurality of filter candles, the filter candles arranged and operated vertically pending from the separation wall;
   wherein said fluid inlet is arranged in fluid communication with said raw gas chamber upstream of said plurality of vertically pending filter candles;
   wherein said fluid outlet is arranged in fluid communication with said clean gas chamber downstream of said plurality of vertically pending filter candles; and
   wherein said filter system comprises a first catalytic medium which is accommodated in said clean gas chamber downstream of said vertically pending filter candles and upstream of said fluid outlet, and the filter system further comprises a blow back device accommodated in said clean gas chamber, wherein the blow back device is positioned in the clean gas chamber upstream of the first catalytic medium, and the blow back device is arranged to blow back gas through the vertically pending filter candles into the raw gas chamber to regenerate the vertically pending filter candles; wherein said plurality of vertically pending filter candles extend from the separation wall into the raw gas chamber.

2. The catalytic filter system of claim 1, wherein said vertically pending filter candles comprise a catalyst.

3. The catalytic filter system of claim 1, wherein said vertically pending filter candles comprise an outer filter membrane upstream of the filter element.

4. The catalytic filter system of claim 1, further comprising a second catalytic medium downstream of said first catalytic medium and upstream of said clean gas outlet.

5. The catalytic filter system of claim 4, wherein said first and/or second catalytic medium comprises a filter element having an average pore size of about equal to or larger than the average pore size of the vertically pending filter candles.

6. The catalytic filter system of claim 4, wherein the first and/or second catalytic medium is provided in the form of a safety fuse.

7. The catalytic filter system of claim 4, wherein the vessel includes a detachable upper housing part which is connected to the lower main part of the vessel downstream of the separation wall.

8. The catalytic filter system of claim 7, wherein said detachable housing part is designed to accommodate the first and/or second catalytic medium.

9. The catalytic filter system of claim 1, wherein the vessel includes a detachable upper housing part which is connected to the lower main part of the vessel downstream of the separation wall and said detachable housing part is designed to accommodate the first catalytic medium.

10. The catalytic filter system of claim 1, wherein the first catalytic medium and the optional second and any further catalytic medium comprises a catalytic element in the form of a catalytic fixed bed, a fiber mat, a foamed structure and/or a honeycomb structure.

11. The catalytic filter system of claim 1, wherein said first catalytic medium comprises a filter element having an average pore size of about equal to or larger than the average pore size of the vertically pending filter candles.

12. The catalytic filter system of claim 1, wherein the first catalytic medium is provided in the form of a safety fuse.

* * * * *